May 12, 1942.  B. L. ENGELKE  2,282,999
WASHING MACHINE
Filed June 8, 1940   2 Sheets-Sheet 1

INVENTOR.
Bernard L. Engelke,
BY

May 12, 1942. B. L. ENGELKE 2,282,999
WASHING MACHINE
Filed June 8, 1940 2 Sheets-Sheet 2

INVENTOR.
Bernard L. Engelke,
BY R. W. Smith

Patented May 12, 1942

2,282,999

UNITED STATES PATENT OFFICE 2,282,999

WASHING MACHINE

Bernard L. Engelke, Los Angeles, Calif.

Application June 8, 1940, Serial No. 339,513

1 Claim. (Cl. 74—75)

This invention is a washing machine of the oscillating-washing and centrifugally-drying type; and has for its object to enclose the drive mechanism in a housing which contains a lubricant, with drive shafts projecting from the housing and rotated at different speeds, and with operating connections and a selective clutch spaced from the housing and adapted to selectively oscillate or rotate the basket of the washing machine by the respective drive shafts.

It is a further object of the invention to provide a friction clutch for selectively oscillating or rotating the basket of the washing machine by the respective drive shafts.

The invention thus provides a drive mechanism which is a unitary assembly, with this unit adequately lubricated and with the lubricant sealed in the housing of the unit, and with the drive shafts which project from this housing and which are rotated at different speeds adapted for convenient operative connection with the shaft of the basket of the washing machine for selectively oscillating or rotating the basket.

Figure 1:
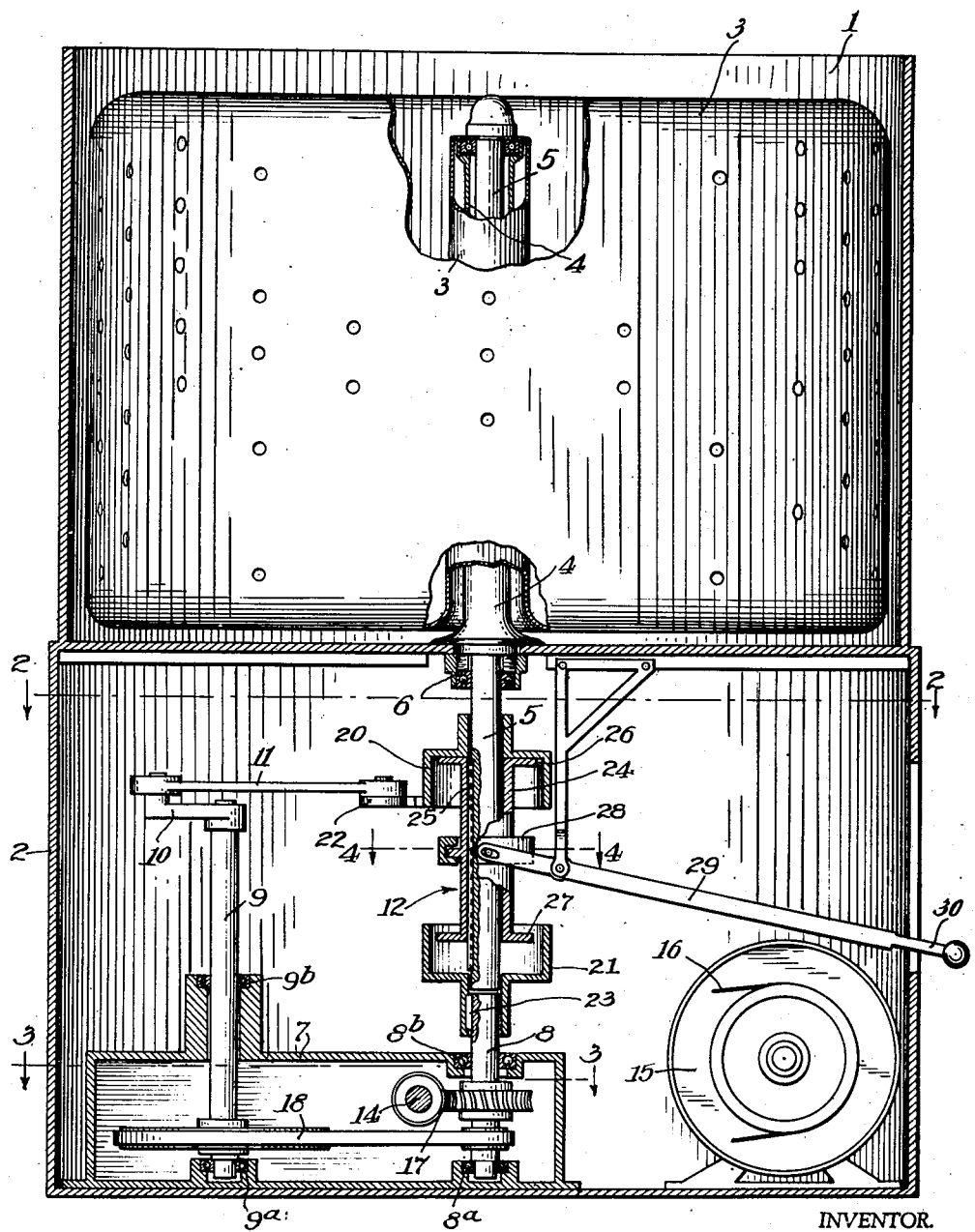

Further objects of the invention will be readily understood from the following description of the accompanying drawings, in which:

Fig. 1 is a vertical section through the washing machine.

Figure 2:
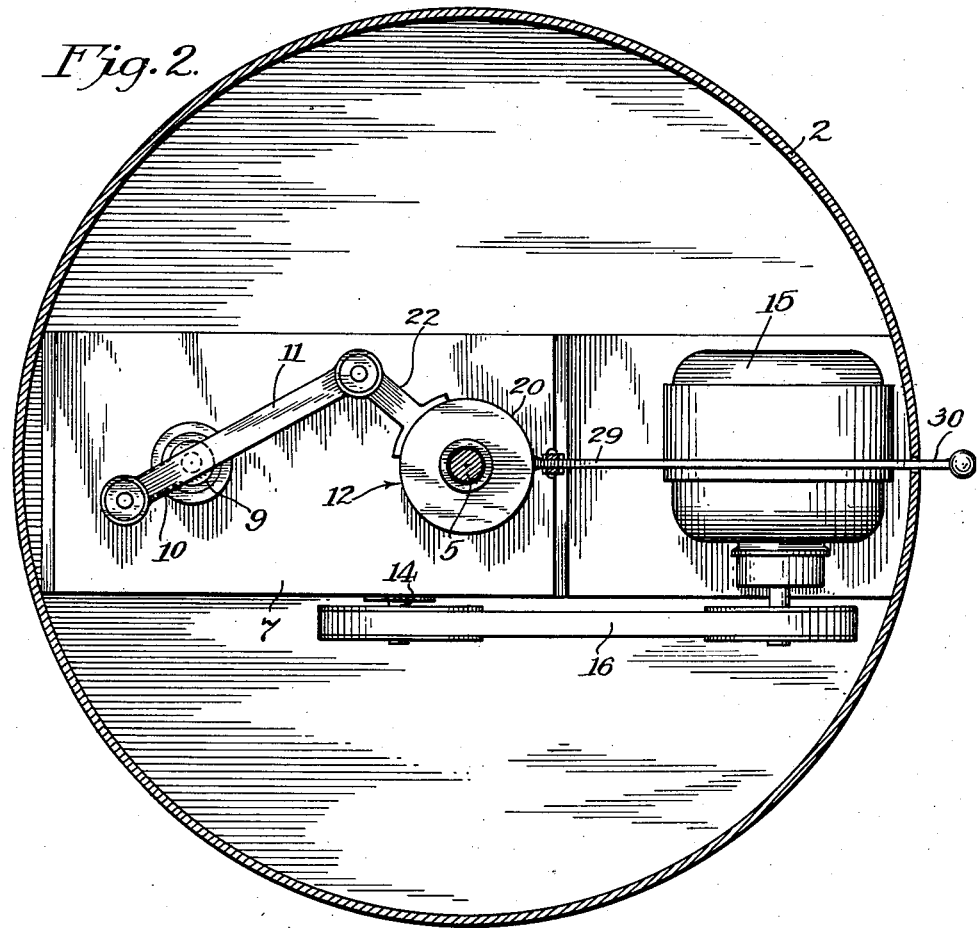
Figure 3:
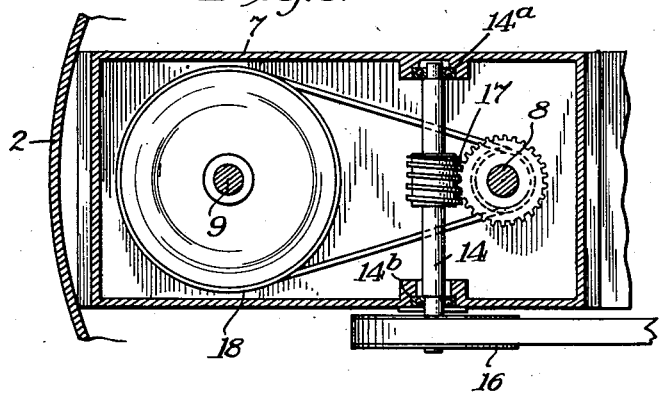
Figure 4:
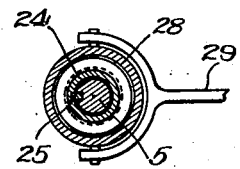

Figs. 2, 3 and 4 are transverse sections on the lines 2—2, 3—3 and 4—4 respectively of Fig. 1.

The washing machine comprises a tub 1 mounted on a casing 2 for the drive mechanism and the operating connections, with a basket 3 journaled in the tub at the upper end of a pedestal 4, and with a shaft 5 for oscillating or rotating the basket projecting from the lower end of the pedestal and journaled in the casing 2 as shown at 6.

Drive mechanism is enclosed in a housing 7 which is mounted in the casing 2, with shafts 8—9 projecting from the housing into the casing 2 and adapted for rotation at different speeds. The projecting shaft 8 is axially alined with the shaft 5, and the shaft 9 projects upwardly at one side of the shaft 5 with a crank and pitman 10—11 at the upper end of the shaft 9. The pitman 11 and the shaft 8 are adapted for selective operative connection with the shaft 5 by a double friction clutch 12 which is mounted on the shaft 5 within the casing 2.

The shafts 8—9 are journaled in the housing 7 at anti-friction bearings 8a—8b and at anti-friction bearings 9a—9b respectively, the bearings 8a—9a being at the base of the housing 7 and the bearings 8b—9b being at the top of the housing, with the shafts 8—9 projecting upwardly through these last mentioned bearings. The shafts 8—9 are rotated at different speeds by a transverse shaft 14 which is journaled in anti-friction bearings 14a—14b in the side walls of the housing 7, with one end of the shaft 14 projecting from the housing 7 and into the casing 2 and rotated by a driving connection which is shown as an electric motor 15, mounted in the casing 2 and having a belt drive 16 for the shaft 14. A worm gear drive 17 which is enclosed in the housing 7 between the shaft 14 and the shaft 8 rotates the shaft 8 at relatively high speed, and a belt drive 18 which is enclosed in the housing 7 between the shaft 8 and the shaft 9 rotates the shaft 9 at relatively low speed.

The double friction clutch 12 comprises longitudinally spaced annuli 20—21 which have friction faces and which are journaled on the shaft 5 in the casing 2. The pitman 11 is pivoted to a radial arm 22 of the annulus 20 for oscillating this annulus, and the projecting end of the shaft 8 is keyed to the annulus 21 as shown at 23. A sleeve 24 is splined at 25 on the shaft 5, between the friction annuli 20—21, whereby friction faces 26—27 at the respective ends of the sleeve may be selectively engaged with the friction faces of the respective annuli 20—21, or the sleeve may be shifted to a neutral position disengaging both friction faces 26—27 from the cooperating friction faces of the annuli 20—21.

The sleeve 24 may be shifted by a yoke and lever 28—29, with the end of the lever projecting from the casing 2 and terminating in a handle 30. When the handle is shifted to intermediate neutral position the clutch 12 is disengaged and the drive mechanism in the housing 7 and the projecting drive shafts 8—9 may thus be rotated without oscillating or rotating the shaft 5.

By shifting the handle 30 to the position shown at Fig. 1, the friction faces 20—26 are engaged, thereby oscillating the shaft 5 by the crank and pitman operating connection 10—11 and thus providing relatively low speed oscillating-washing movement for the basket 3. By shifting the handle 30 to its opposite limit of movement the friction faces 21—27 are engaged, thereby rotating the shaft 5 by the shaft 8 and thus providing relatively high speed centrifugal-drying rotation for the basket 3.

The invention thus completely encloses the drive mechanism in the housing 7, thereby providing a unitary drive mechanism adapted for mounting in the casing 2, with the drive shafts 8—9 which project from the housing 7 adapted to be driven at different speeds by the common drive shaft 14, and with the housing 7 adapted to contain a lubricant which lubricates all parts of the drive mechanism but is sealed against escape of lubricant from the housing 7 into the casing 2. The unitary drive mechanism is adapted for mounting in the casing 2 so that its projecting drive shafts 8—9 are adapted for convenient assembly with relation to the operating connections which are provided respectively by the crank and pitman 10—11 and by the key 23, with these operating connections clear of the housing 7. The double friction clutch 12 is also adapted for convenient operative assembly with relation to the operating connections, clear of the housing 7, for selectively shifting the clutch for oscillating or rotating the shaft 5 or for stopping movement of the shaft, and thereby oscillating or rotating the basket 3 or completely arresting its movement.

I claim:

In drive mechanism for a washing machine basket, a main shaft for oscillating or rotating the basket, drive shafts, a double clutch comprising elements adapted to respectively form driving connections for the main shaft responsive to selective engagement of the double clutch, means for rotating one of the clutch elements with one of the drive shafts, and means for oscillating the other clutch element by rotation of the other drive shaft; said last mentioned means comprising a crank on said other drive shaft, a radial arm fixed to said other clutch element, and a pitman pivoted at its respective ends to said crank and said radial arm.

BERNARD L. ENGELKE.